(12) United States Patent
Kim et al.

(10) Patent No.: US 11,821,213 B2
(45) Date of Patent: Nov. 21, 2023

(54) BLOCK-TYPE PREFABRICATED RAMP

(71) Applicant: HUMAN TECHNOLOGY & COMPLEX CO., LTD, Gyeonggi-do (KR)

(72) Inventors: Hee Sub Kim, Gyeonggi-do (KR); Sam Young Kim, Gyeonggi-do (KR); Dong Kwang Lee, Seoul (KR)

(73) Assignee: HUMAN TECHNOLOGY & COMPLEX CO., LTD, Gyeonggi-Do (KR)

( * ) Notice: Subject to any disclaimer, the term of this patent is extended or adjusted under 35 U.S.C. 154(b) by 0 days.

(21) Appl. No.: 18/033,860

(22) PCT Filed: Nov. 23, 2021

(86) PCT No.: PCT/KR2021/017212
§ 371 (c)(1),
(2) Date: Apr. 26, 2023

(87) PCT Pub. No.: WO2022/092996
PCT Pub. Date: May 5, 2022

(65) Prior Publication Data
US 2023/0304292 A1    Sep. 28, 2023

(30) Foreign Application Priority Data
Oct. 27, 2020  (KR) .......... 10-2020-0140207

(51) Int. Cl.
*E04F 11/00*    (2006.01)

(52) U.S. Cl.
CPC ....... *E04F 11/002* (2013.01); *E04F 2011/007* (2013.01)

(58) Field of Classification Search
CPC .................................................... E04F 11/002
See application file for complete search history.

(56) References Cited

U.S. PATENT DOCUMENTS

| 621,700 | A | * | 3/1899 | Olson | ...... G10D 3/04 84/298 |
| 1,114,768 | A | * | 10/1914 | Hyde | ...... B60B 15/00 301/44.3 |

(Continued)

FOREIGN PATENT DOCUMENTS

| JP | S57-145037 U | 9/1982 |
| JP | H07-30811 Y2 | 7/1995 |

(Continued)

OTHER PUBLICATIONS

International Search Report for PCT/KR2021/017212 dated Feb. 21, 2022.

(Continued)

*Primary Examiner* — Thomas B Will
*Assistant Examiner* — Katherine J Chu
(74) *Attorney, Agent, or Firm* — The PL Law Group, PLLC

(57) ABSTRACT

A block-type modular ramp is to be provided in a place where a step or bump is formed. The block-type modular ramp includes block bodies arranged in a horizontal direction and stacked vertically to form a backbone, a fastening member for fastening the block bodies arranged in the horizontal direction to each other, a fixing pin for fixing the block bodies stacked vertically to each other, a fixing member coupled to the block bodies and fixing the block bodies to a floor surface where to install the ramp, fastening grooves formed in the block bodies, and fixing holes formed in the block bodies in an up-down direction.

4 Claims, 10 Drawing Sheets

(56) References Cited

U.S. PATENT DOCUMENTS

| | | | |
|---|---|---|---|
| 6,718,588 B1* | 4/2004 | Frederiksen | E04F 11/002 404/35 |
| 6,993,801 B2* | 2/2006 | Marko | E01C 13/003 14/69.5 |
| 2002/0124332 A1* | 9/2002 | Janowak | B65G 69/287 14/69.5 |
| 2014/0143961 A1* | 5/2014 | Frederiksen | E04F 11/002 14/73.1 |
| 2020/0140214 A1* | 5/2020 | Gunn | B66F 7/243 |

FOREIGN PATENT DOCUMENTS

| | | |
|---|---|---|
| JP | 2997069 B2 | 1/2000 |
| JP | 2002-339533 A | 11/2002 |
| JP | 2003-503616 A | 1/2003 |
| JP | 2003-206622 A | 7/2003 |
| KR | 100802711 B1 * | 2/2008 |
| KR | 20-2012-0000128 U | 1/2012 |
| KR | 20-2019-0001817 U | 7/2019 |

OTHER PUBLICATIONS

Office action dated Jul. 6, 2022 from Korean Patent Office in a counterpart Korean Patent Application No. 10-2020-0140207 (all the cited references are listed in this IDS.) (English translation is also submitted herewith.).

Notice of Allowance dated Jan. 3, 2023 from Korean Patent Office in a counterpart Korean Patent Application No. 10-2020-0140207 (all the cited references are listed in this IDS.) (English translation is also submitted herewith.).

* cited by examiner

BLOCK-TYPE PREFABRICATED RAMP

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/017212 filed on Nov. 23, 2021, which claims priority to the benefit of Korean Patent Application No. 10-2020-0140207 filed in the Korean Intellectual Property Office on Oct. 27, 2020, the entire contents of which are incorporated herein by reference.

BACKGROUND

1. Technical Field

The present invention relates to a block-type modular ramp which is installed at a place where a step or bump are formed so as to guide a wheelchair user or others with mobility challenges to easily pass, and more particularly to a block-type modular ramp designed for easy installation and removal regardless of a height of the step or bump.

2. Background Art

Typically, the entrance to a building is provided with a stairway, and a ramp is provided next to the stairway for elderly or disabled people. For the ramp, concrete, marble or the like is mainly used, and it is necessary to secure a certain space to install the ramp.

Also, when walking on a sidewalk for pedestrians, many bumps are found. These bumps are also formed low, but there are also high bumps that are hard for wheelchairs or the like to pass. In order to solve this problem, a ramp may be made using concrete or the like, but there is a disadvantage that the ramp cannot be not used for a certain period of time because a curing process is required after installation. In addition, when dismantling the ramp due to a change in use or other reasons, there may be incidents where parts connected to the ramp are damaged during the dismantling process.

Accordingly, there is a constant progress in research on a ramp that can be easily installed and disassembled regardless of an installation height.

SUMMARY

An aspect of the present invention is to provide a block-type modular ramp which is manufactured as a block type so that the ramp can be easily assembled and separated.

Another aspect of the present invention is to a block-type modular ramp, in which a structure of a fixing pin for fixing stacked block bodies is improved so that assembly and separation of the ramp is possible without breakage of the block bodies and the fixing pin.

In one aspect, there is provided a block-type modular ramp to be provided in a place with a step or bump, and the ramp includes: a plurality of block bodies arranged in a horizontal direction and stacked vertically to form a backbone; a fastening member for fastening the block bodies arranged in the horizontal direction to each other; a fixing pin for fixing the block bodies stacked vertically to each other; and a fixing member coupled to the block bodies and fixing the block bodies to a floor surface where to install the ramp, and a plurality of fastening grooves is formed in the block body from a lower portion to an upper portion thereof, the fastening member is fastened between a fastening groove formed in one of the block body and a fastening groove formed in another block body so as to engage the block bodies with each other in the horizontal direction, and a plurality of fixing holes is formed in the block body in an up-down direction, the fixing holes formed between the block bodies stacked vertically are located on a vertical line, and an upper block body and a lower block body are coupled to each other while the fixing pins are fastened through the fixing holes.

Further, a first key groove is formed in an upper portion of the fixing hole in an outward direction, and a first reference protrusion is formed in the fixing pin so as to correspond to and engage with the first key groove.

Further, an anti-slip member projecting upward is formed in an outer periphery of an upper end of the fixing hole.

Further, a second key groove is further formed in the anti-slip member, and a second reference projection corresponding to and engaging with the second key grooves is further formed in the fixing pin.

Further, the fixing pin includes: a cylindrical fitting pin having an upper end caught and supported by an upper outer periphery of the fixing hole, a lower end caught and supported by a lower outer periphery of the fixing hole, an elongated hole formed in a longitudinal direction to be engaged with the fixing hole, and the first reference projection formed therein; and a support pin having an upper end portion caught and supported by the upper end of the fitting pin, and a lower end inserted into the fitting pin to press the lower end of the fitting pin outward, and the second reference protrusion formed therein.

Further, at least one anti-slip bump is further formed in the anti-slip member.

In addition, the fixing member comprises a fixing support body detachably fitted into a fitting groove that is formed in a lower portion of the block body, and the fixing support body is in a cylindrical shape with an open top, a lower surface of the fixing support body is formed as a flat surface, and a hole is formed in a center of the lower surface.

The present invention described above has the following effects.

First, since the ramp is manufactured as a block type, it is easy to disassemble and assemble.

Further, a head portion of a fixing pin having the same inclination angle as an inclination angle of the ramp can be guided to be fastened in place through a key groove.

In addition, using an anti-slip member formed to protrude upward, it is possible to prevent slipping of a ramp user, a wheelchair, or the like, and it is possible to further increase the anti-slip effect when an anti-slip bump is provided.

In addition, in a case where the fixing pin is configured as a double structure of a fitting pin and a support pin, since the fixing pin is guided so as to be more easily engaged and disengaged, it is possible to prevent breakage of the fixing pin and breakage of a block body to which the fixing fin is engaged.

Further, it is possible to easily perform fastening and separating operations on a floor surface of the place where the ramp is installed using the fixing member.

DETAILED DESCRIPTION

Figure 1:
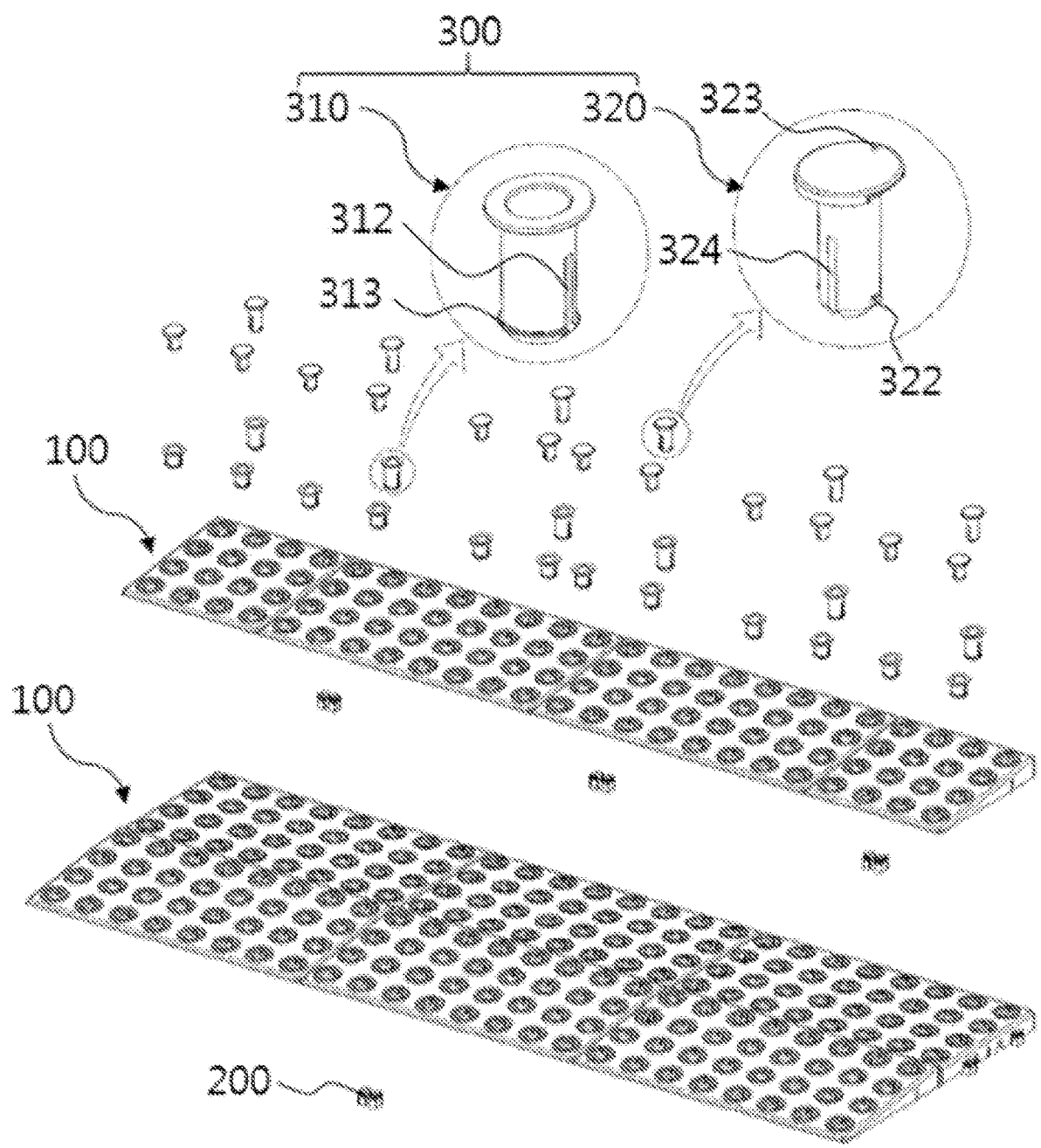
FIG. 1 is a front exploded perspective view of an embodiment of a block-type modular ramp according to the present invention.

Some embodiments of the present invention will now be described in detail with reference to exemplary drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) and the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

Figure 2:
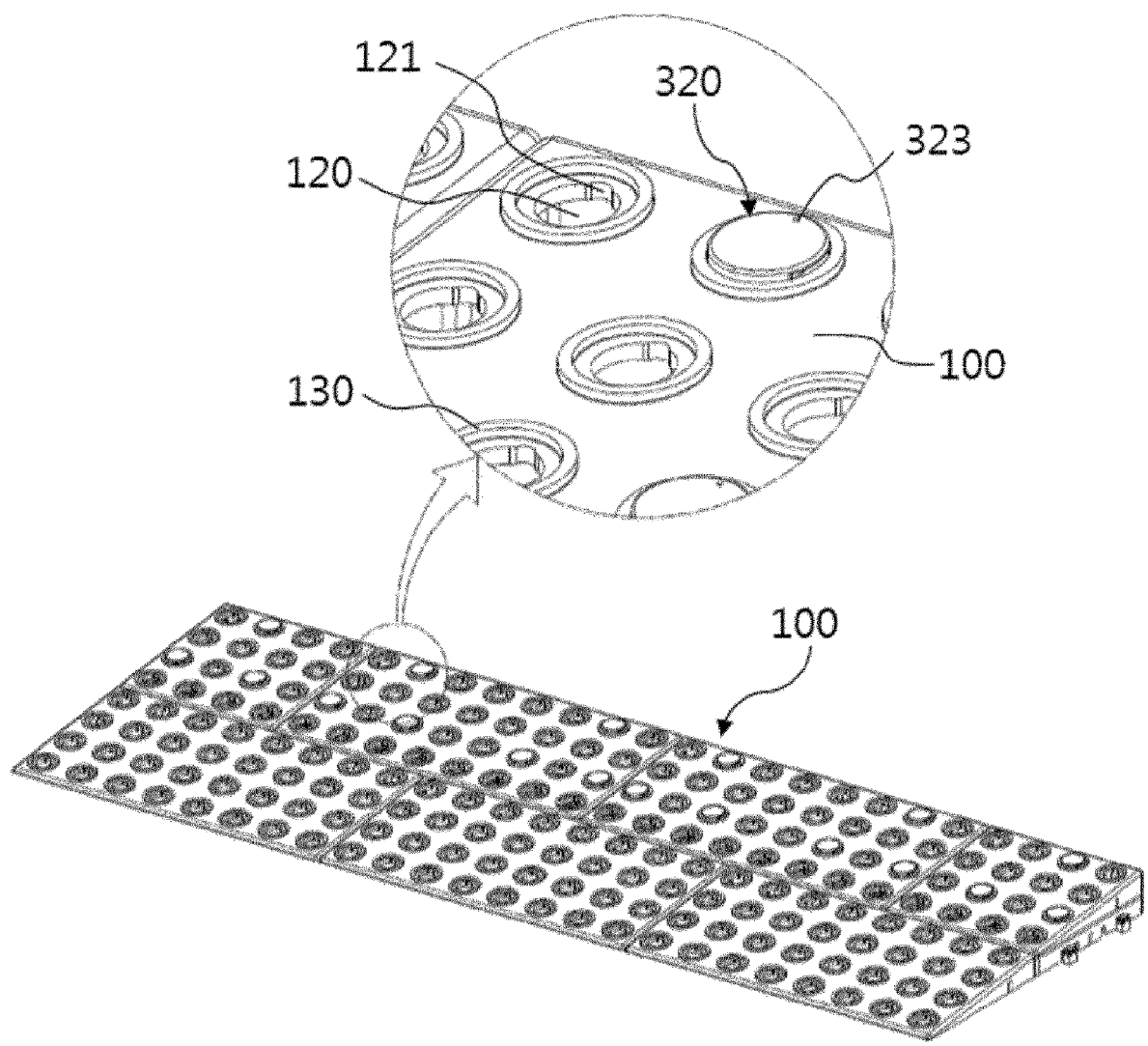
FIG. 2 is a coupled perspective view of FIG. 1.
Figure 3:
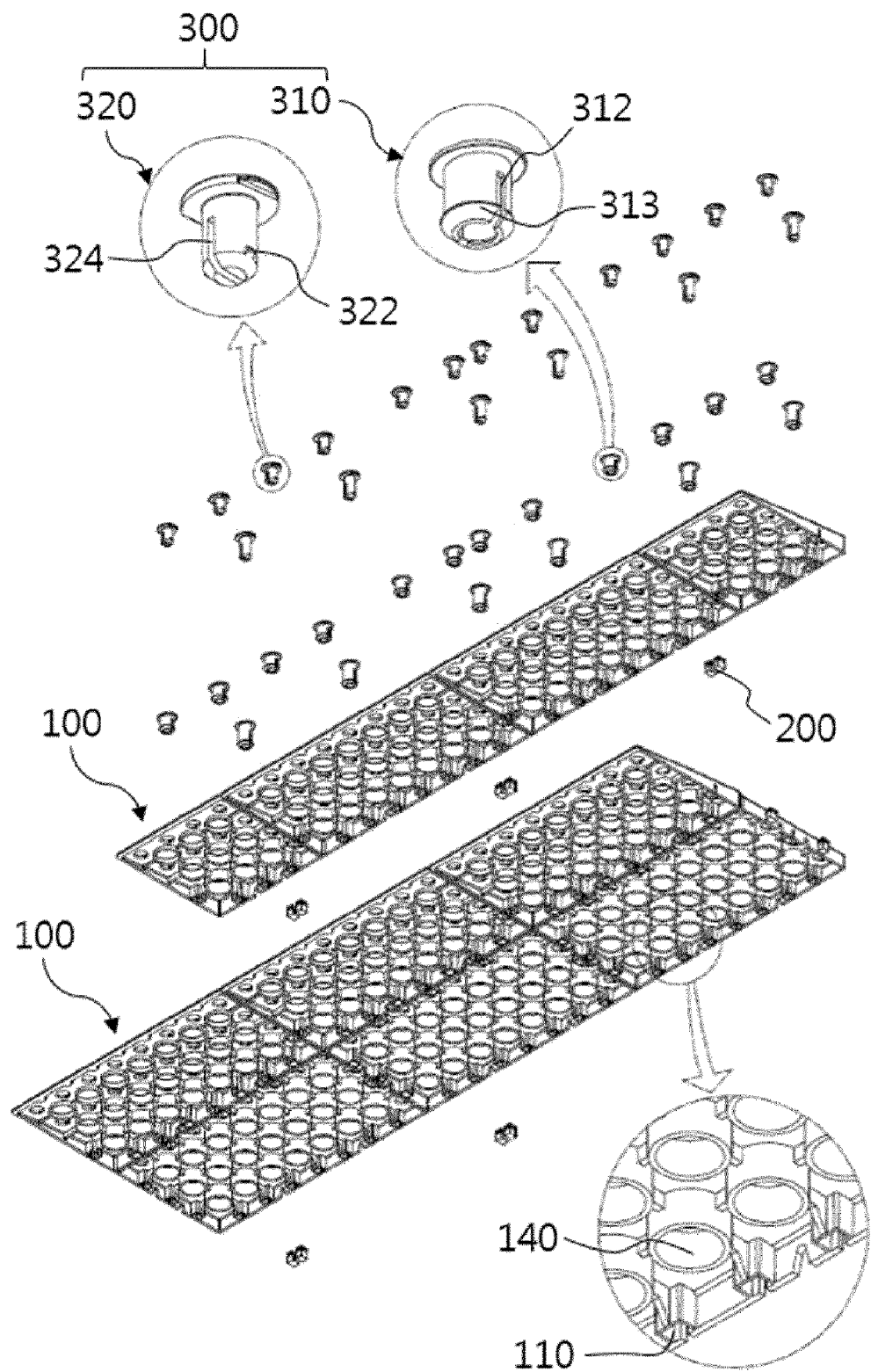
FIG. 3 is an exploded bottom perspective view of an embodiment of a block-type modular ramp according to the present invention.
Figure 4:
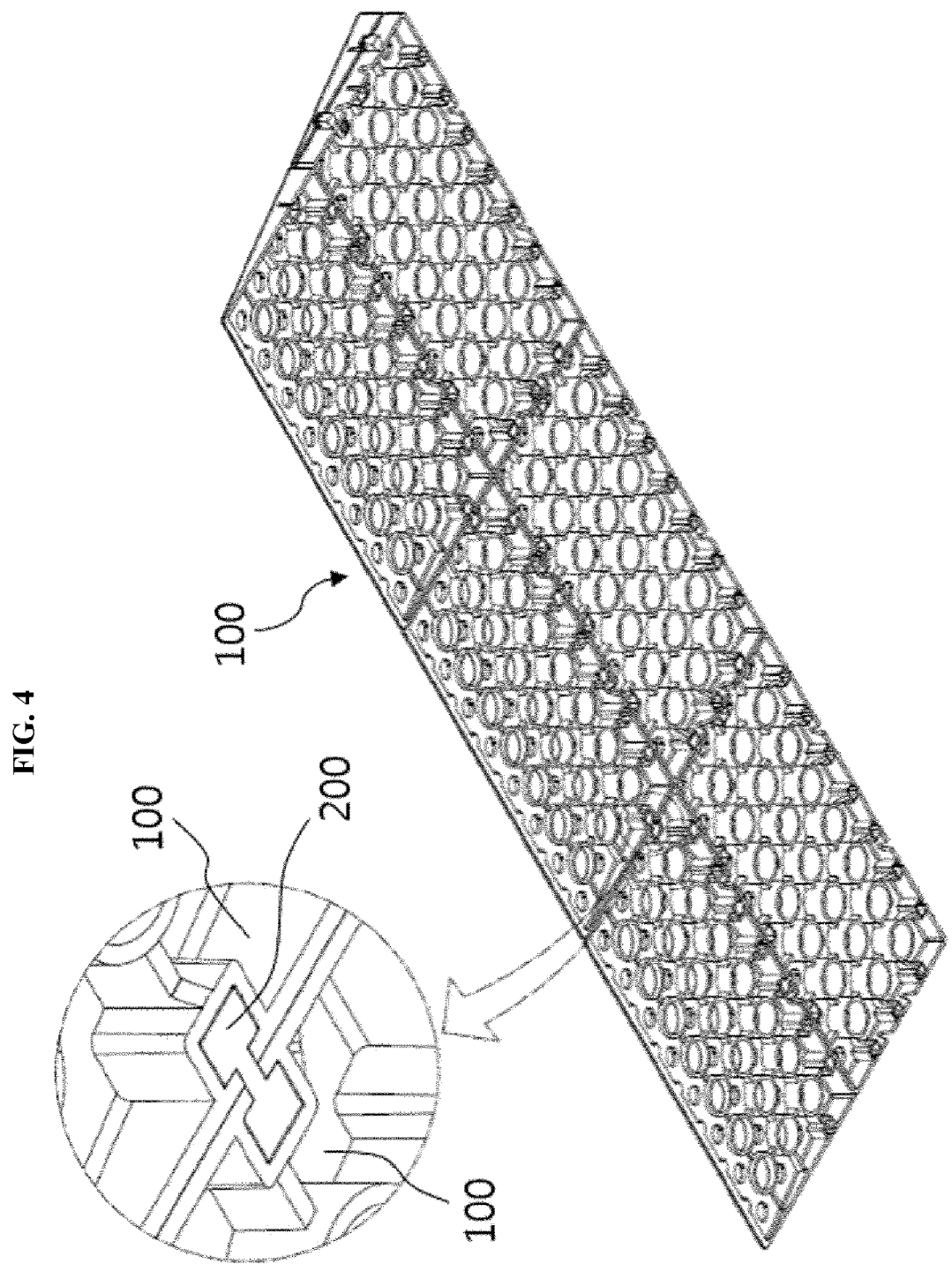
FIG. 4 is a coupled perspective view of FIG. 3.

FIG. 1 is a front exploded perspective view of an embodiment of a block-type modular ramp according to the present invention, FIG. 2 is a coupled perspective view of FIG. 1, FIG. 3 is a bottom exploded perspective view of the embodiment of the block-type modular ramp, and FIG. 4 is a coupled cross-sectional view of FIG. 3.

First, the structure of the block-type modular ramp of the present invention will be described with reference to FIGS. 1 to 4.

A block-type modular ramp includes a block body 100, a fastening member 200, a fixing pin 300, and a fixing member 400.

The block body 100 is a part that form the backbone of the modular ramp, and have a structure in which block bodies 100 are arranged horizontally with each other and stacked upward. That is, a plurality of block bodies 100 is arranged and stacked to form a ramp. The ramp may be constructed in a place where a step or bump is formed. A block body 100 may be formed of a plurality of layers, but is preferably formed of one or two layers. At this point, a tip portion forming an inclined surface may form one inclined block body 100. Further, a thickness of the remaining block body 100 other than the block body 100 forming the inclined surface may be the same or different compared to a thickness of the block body 100 forming the inclined surface. In the case of manufacturing the block bodies 100 with the same thickness, the thickness of the block bodies 100 is determined by taking into account a location of installation of the ramp and a minimum thickness of engagement portions of the block bodies 100. Further, even if the block bodies 100 have the same thickness, the thickness may vary depending on a location of installation of the ramp. It is also possible to use block bodies 100 of different thicknesses at the same location. Furthermore, the minimum thickness of the block bodies 100 close to a step or bump may correspond to the maximum height that a wheelchair or the like can pass without a ramp. For example, assuming that there is a step or bump of 10 cm in thickness, a ramp may be formed using two block bodies 100 each having a thickness of 5 cm. Also, assuming that there is a step or bump of 9 cm in thickness, a ramp may be formed using two block bodies 100 each having a thickness of 4.5 cm. Further, assuming that there is a step or a bump of 9 cm in thickness, a ramp may be formed using a body block 100 of 5 cm in thickness and a body block 100 of 4 cm in thickness. Further, in a case where the minimum thickness of each block body 100 is 3 cm, if a height of a step or bump is 4 cm, it is preferable to use one block body 100 of 4 cm in thickness and the one block body 110 forms an inclined surface. Of course, in a case where a height of a bump is 4 cm and a height of a bump through which a wheelchair can pass without a ramp is 2 cm, a ramp may be formed in thickness of 3 cm, which is the minimum thickness of the block body 100, and a bump of 1 cm may be maintained. In a case where two or more block bodies 100 are stacked to form a ramp, the block body 100 located uppermost forms an inclined surface, and the shape of the other block body 100 located below the uppermost block body has a rectangular parallelepiped shape. Of course, as described above, the tip portion forming the inclined surface may be configured as one inclined block body 100. Meanwhile, when the block bodies 100 are stacked, it is preferable to stack blocks in a staggered manner like stacking bricks.

For the material of the block-type ramp of the present invention, a plastic material having durability and a certain strength or more may be used, for example, polypropylene (PP). Since a flexible material such as rubber or the like is troublesome to apply to a component of the present invention, it is preferable to apply a material having a certain strength or more whose original shape can be maintained. The material of the block body 100 may be a mixture of one or more materials.

The fastening member 200 is to fix the block bodies 100 arranged in a horizontal direction to each other, and as shown in FIGS. 3 and 4, a plurality of fastening grooves 110 may be formed in a periphery of each block body 100 from the bottom to the top. In addition, a fastening member 200 may be fastened between a fastening groove 110 formed in one block body 100 and a fastening groove 110 formed in the other block body 100, so that the block bodies 100 arranged in the horizontal direction are coupled and fixed to each other. At this point, the fastening member 200 has a shape corresponding to that of the fastening grooves 110, and it is not preferable to limit the shape of the fastening member 200 and the shape the fastening grooves 110 only as shown in the drawings.

The fixing pin 300 serves to fix the stacked block bodies 100 to each other in an upward direction. That is, a plurality of fixing holes 120 is formed in each block body 100 in a vertical direction. The fixing holes 120 formed in the block bodies 100 stacked vertically are located on a vertical line. The fixing pin 300 is fastened through the fixing hole 120 so that the block body 100 located at the upper side and the block bodies 100 located below are coupled to each other. The fixing pins 300 are not fastened to the fixing holes 120, respectively, but in order to maintain a coupled state of the block body 100 located on the upper side and the block body 100 located on the lower side, two to four fixing pins for one block body 100 or two to four fixing pins for two block bodies 100 may be fastened, for example.

Figure 5:
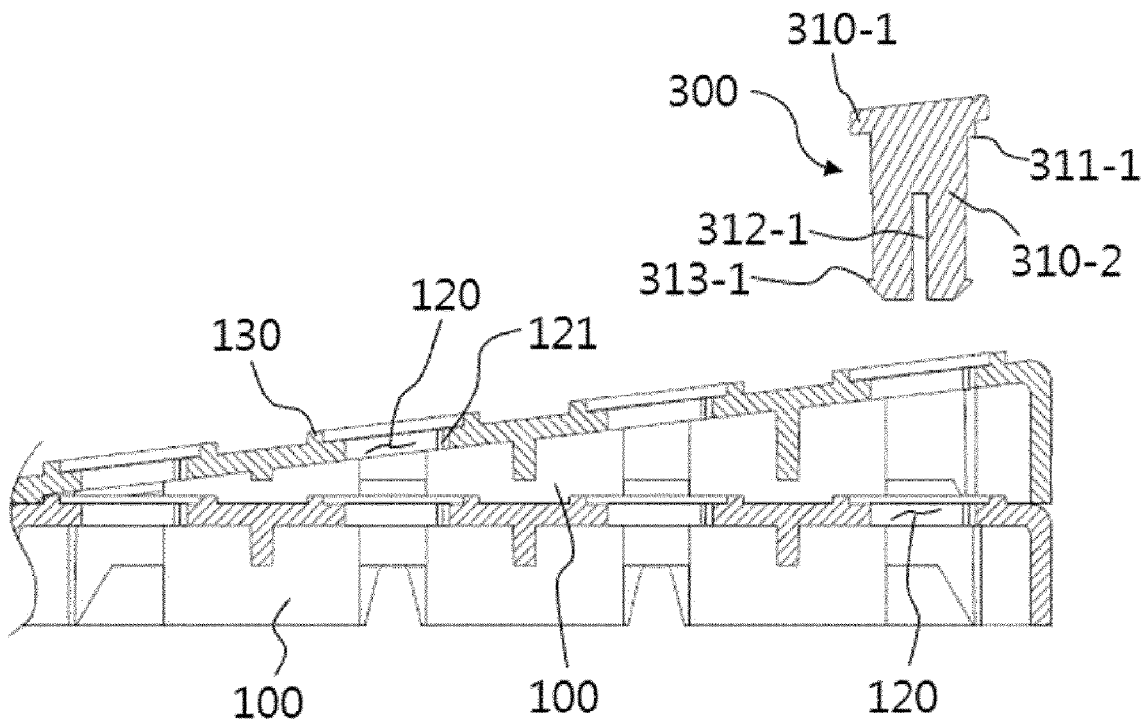
FIG. 5 is an exploded cross-cross-sectional view showing a state before coupling according to an embodiment of a fixing pin of the present invention.
Figure 6:
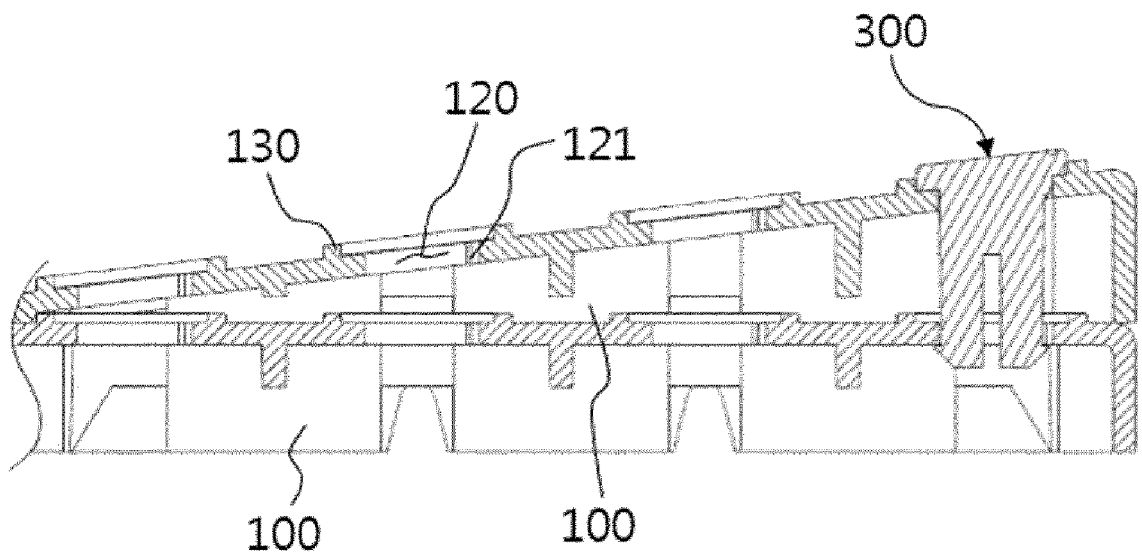
FIG. 6 is a coupled cross-sectional view of FIG. 5.
Figure 7:
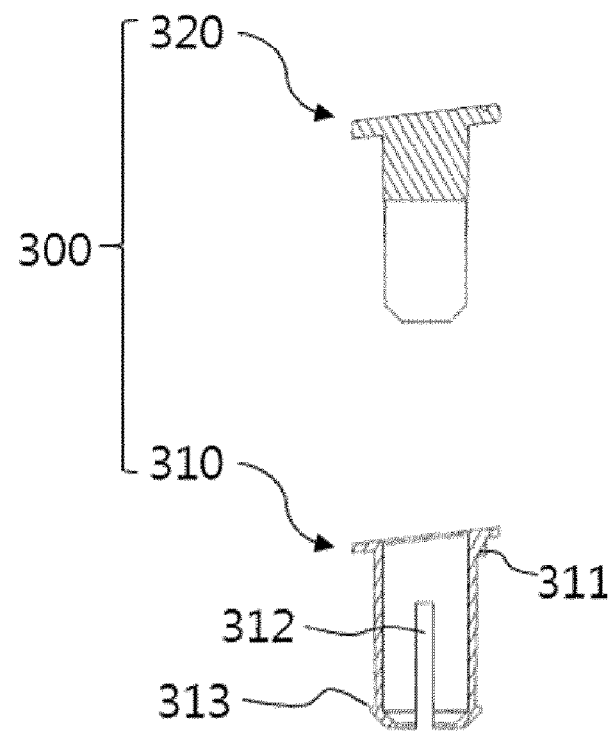
FIG. 7 is an exploded cross-sectional view of a state before coupling according to another embodiment of a fixing pin of the present invention.
Figure 7:
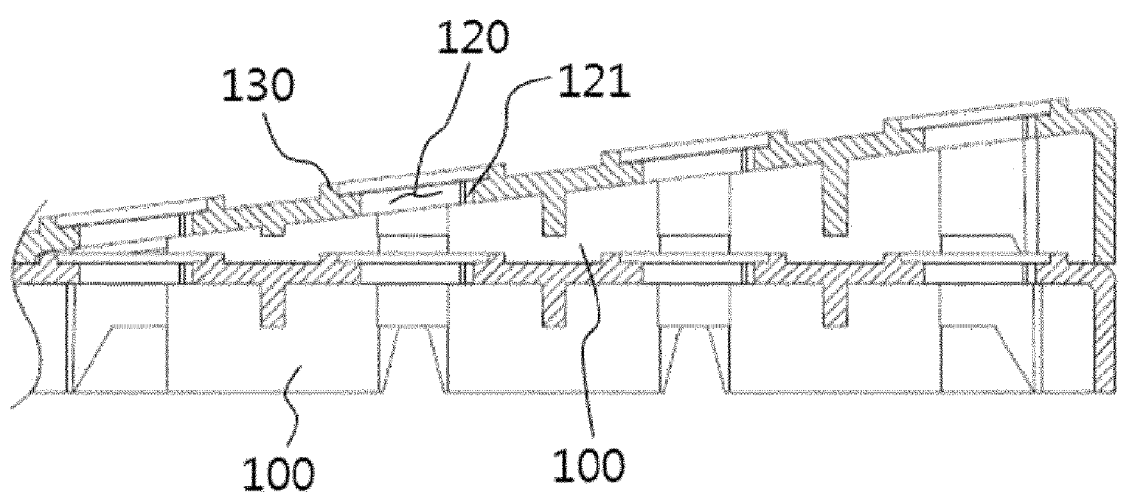
Figure 8:
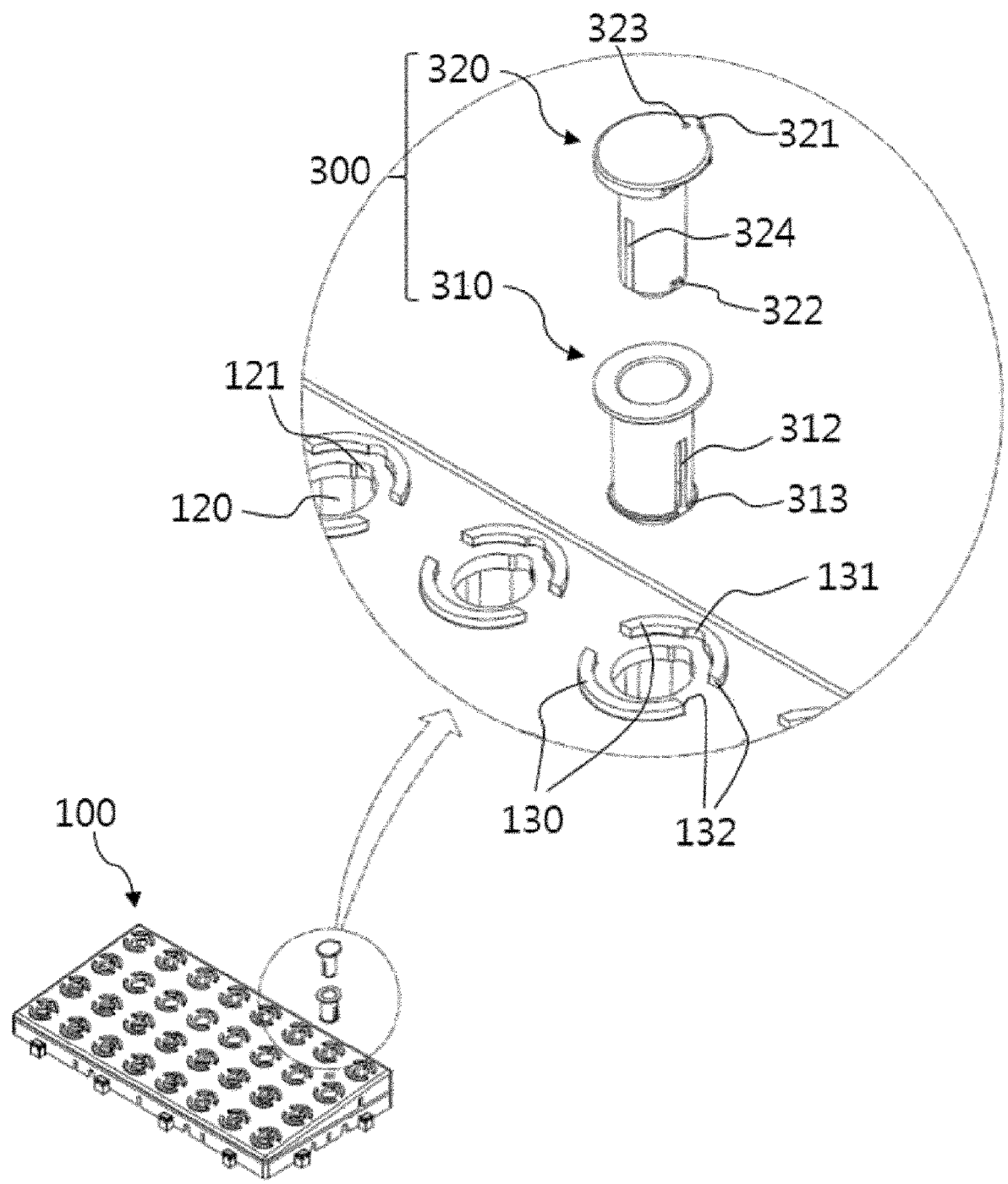
FIG. 8 is a perspective view of FIG. 7.
Figure 9:
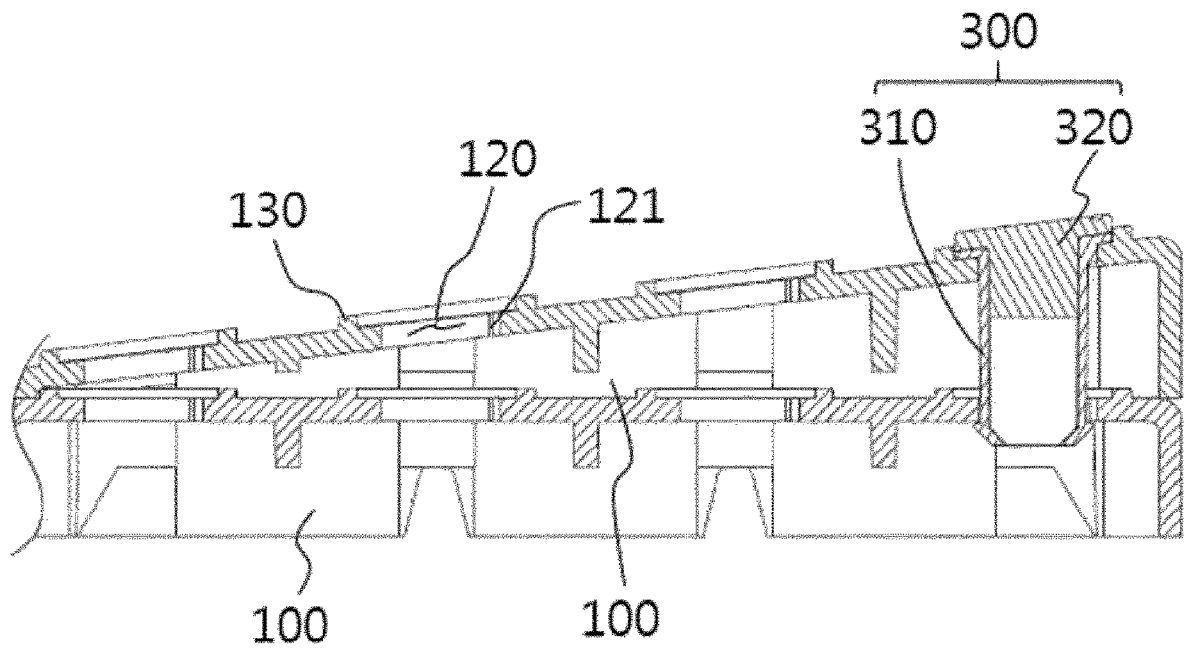
FIG. 9 is a coupled cross-sectional view of FIG. 7.

FIG. 5 is an exploded cross-cross-sectional view showing a state before coupling according to an embodiment of a fixing pin 300 of the present invention, FIG. 6 is a coupled cross-sectional view of FIG. 5, FIG. 7 is an exploded cross-sectional view of a state before coupling according to another embodiment of a fixing pin 300 of the present invention, FIG. 8 is a perspective view of FIG. 7, and FIG. 9 is a coupled cross-sectional view in FIG. 7.

With reference to FIGS. 5 to 9 in conjunction with FIGS. 1 to 4, a structure according to one and the other embodiments of a fixing pin 300 will be described in more detail.

The fixing pin 300 may configured in one body (one embodiment) as in FIGS. 5 and 6, or may be configured in two bodies (an alternative embodiment) as in FIGS. 7 to 9.

Referring to FIGS. 5 and 6, the fixing pin 300 may include a fixing head 310-1 whose upper end surface forms an inclined surface at an angle corresponding to an inclination of the block body 100 forming an inclined surface, and a fitting body 310-2 positioned below the fixing head 310-1 and inserted into a fixing hole 120. When the fixing pin 300 is inserted into the fixing hole 120, the fixing head 310-1 is supported on an outer peripheral surface of the upper end of the fixing hole 120. A locking protrusion 313-1 is formed in an outer periphery of a lower end of the fitting body 310-2. At this point, a long hole 312-1 is formed in the lower portion of the fitting body 310-2 in a longitudinal direction, and when the fitting body 310-2 is inserted into the fixing hole 120, the long hole 312-1 provides a predetermined elastic force, and the locking protrusion 313-1 is supported on the outer periphery of the lower part of the fixation hole 120 while the fitting body 310-2 flexes inward and returns to its original shape.

Meanwhile, as shown in the enlarged view of FIG. 2, a first key groove 121 is formed in the upper portion of the fixed hole 120. A first reference projection 311-1 having a shape corresponding to that of the first key groove 121 is also formed in a connecting portion between the fixing head 310-1 and the fitting body 310-2. Since an upper surface of each fixing head 310-1 forms an inclined surface, it is not easy to fix the fixing pins 300 in right place to allow the inclined surfaces to coincide with each other when the fixing pins 300 are fastened to the fixing holes 120. Therefore, by positioning and fastening the first reference projection 311-1 in the first key groove 121, it is possible to easily guide fastening of the fixing pins in right place.

Next, referring to FIGS. 7 to 9, a fixing pin 300 comprises a fitting pin 310 and a support pin 320.

The upper portion of the fitting pin 310 forms an inclined surface corresponding to the inclined surface of the block body 100, and when the fitting pin 310 is inserted into the fixing hole 120, the upper portion of the fitting pin 310 engaged with the upper outer periphery of the fixing hole 120. The aforementioned first reference projection 311 is also formed below the upper end of the fitting pin 310. A locking protrusion 313 is formed in a lower end portion of the fitting pin 310, and when the insertion pin 310 is inserted into the fixing hole 120, the lower end portion of the fitting pin 310 is engaged with and supported by a lower outer periphery of the fixing hole 120. The fitting pin 310 has a cylindrical shape and a hole is formed at the center thereof in a vertical direction. Further, a long hole 312 is formed in the lower portion of the fitting pin 310 in a longitudinal direction to be engaged with the fixing hole 120. When the fitting pin 310 is inserted into the fixing hole 120, the lower portion of the fitting fin 310 is pushed in an inward direction, in which the long hole 312 is formed, and again returns to its original shape, and accordingly, the engagement protrusion formed in the fitting hole 310 is engaged with and supported by the outer periphery of the lower part of the fixed hole 120. At this point, the fitting pin 310 is provided in a cylindrical shape so that a force of holding the locking protrusion 313 can be released. Therefore, by coupling the support pin 320 through the hole formed at the center of the fitting pin 310, it is possible to prevent the support force of the locking protrusion 313 from being released.

The upper end of the support pin 320 may also form an inclined surface corresponding to the inclined surface of the block body 100. When the support pin 320 is inserted into the hole formed at the center of the fitting pin 310, the upper end portion of the support fin 320 is caught and supported by the upper outer periphery of the hole. That is, the upper end portion of the support pin 320 has the same radius as that of the upper end of the fitting pin 310, and the lower surface of the upper end of the supporting pin 320 is seated and supported on the upper surface of the fitting pin 310. At this point, the upper end portion of the support pin 320 also forms an inclined surface, and thus, as described above, for engagement in right place, a second reference projection 321 extending upward in the 12 o'clock direction of the supporting pin 320 may be formed and the second key groove 131 corresponding to a second reference projection 321 may be configured in an anti-slip member 130 described later. Of course, it is also possible to guide the engagement in right place using a separate identification mark 323 without forming the second reference projection 321 and the second key groove 131. The lower portion except for the upper end portion of the support pin 320 is inserted through a hole formed in the center of the fitting pin 310 and taking a columnar shape. That is, a lower diameter of the support pin 320 corresponds to a diameter of said hole of the fitting pin 310, and when the support pin 320 is fastened to the fitting pin 310, the fitting pin 310 is supported by the support fin 320, thereby preventing the fitting pin 310 from being bent in the inward direction and helping the fitting pin 310 remain in its original shape. At this point, it is possible to provide a structure in which the long hole 324 is formed in a longitudinal direction in a lower portion of the support pin 320 and the lower portion of the support pin 320 is pressed at a predetermined interval with a predetermined tension in a direction in which the long hole 324 is formed, so that the support pin 320 can be easily inserted into the fitting pin 310. Even if the long hole 324 is formed in the lower portion of the support pin 320, a higher tension than that of a tubular fitting pin 310 may be maintained, so it is possible to secure a supporting force of the locking protrusion 313 formed in the fitting pin 310 with respect to the lower part of the fixing hole 120. Meanwhile, at the lower end of the support pin 320, an engagement protrusion 322 is formed in an outward direction. The engaging protrusion 322 is inserted into the long hole 312 of the fitting pin 310. The engagement protrusion 322 helps the engagement protrusions 322 to be caught by the upper end of the long hole 312 when the support pin 320 coupled to the fitting pin 310 is detached upward, so that the support pin 320 is prevented from being completely detached from the fitting pin 310, thereby preventing the block bodies 100 stacked one above the other from being separated from each other.

Referring to FIG. 8, the upper outer periphery of the fixing hole 120 is provided with the anti-slip member 130 projecting upward. The anti-slip member 130 is a part in which the upper portion of the fixing pin 300 is seated and supported, and has a shape corresponding to the upper shape of the fixing pin 300 and is shown as a circular shape in the drawing. The anti-slip member 130 has an upwardly projecting shape to prevent a wheelchair or the like from sliding downward on the inclined surface when the wheelchair or the like moves over the inclined surface. Further, the anti-slip member 130 may further be formed with at least one anti-slip bump 132. The anti-slip bump 132 is formed in a direction perpendicular to the inclined surface, i.e., in a horizontal direction, and the anti-slip effect may be further improved when the anti-slip bump 132 is provided.

Figure 10:
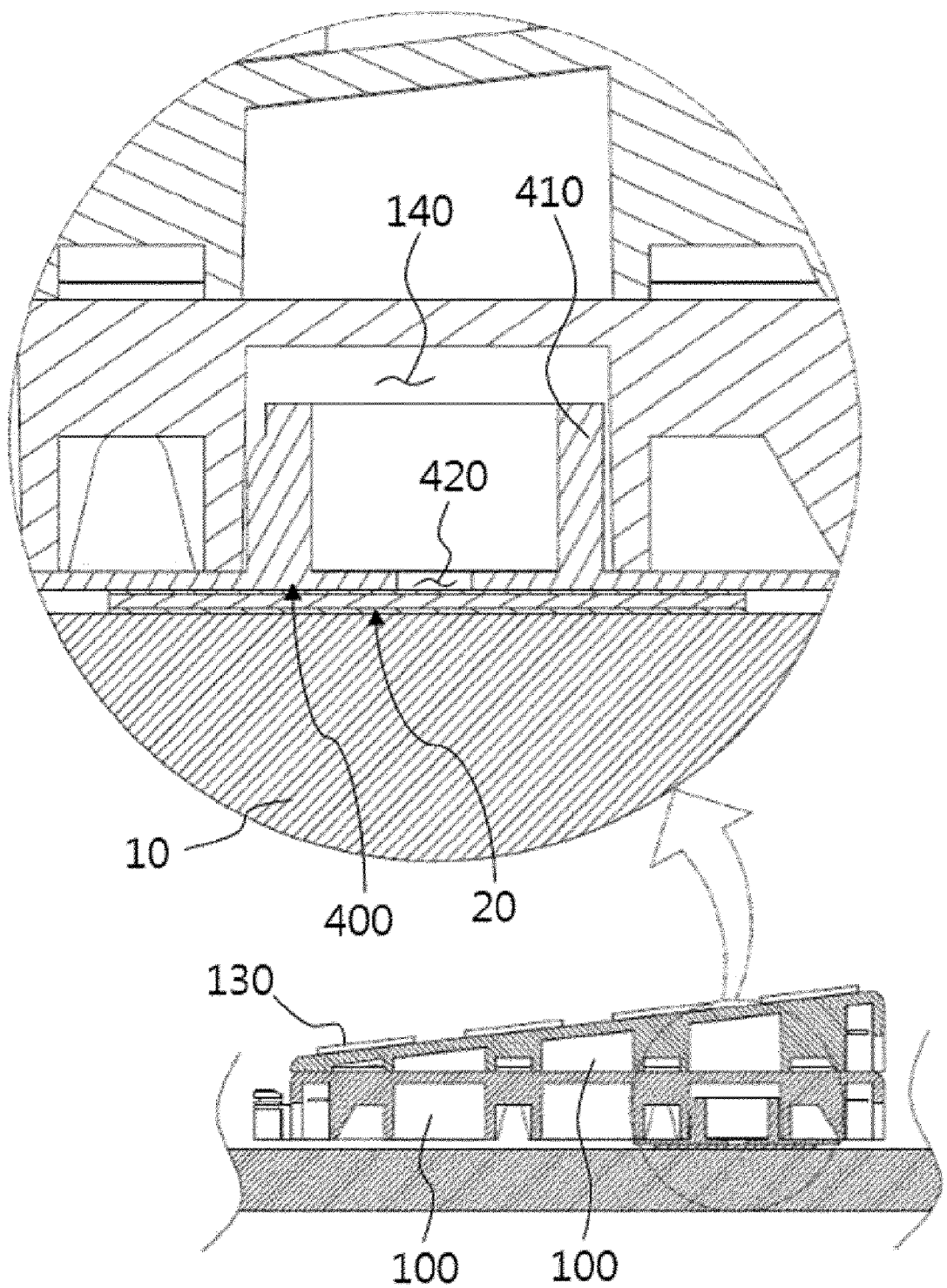
FIG. 10 is a cross-cross-sectional view of an embodiment of a fastener according to the present invention.
Figure 11:
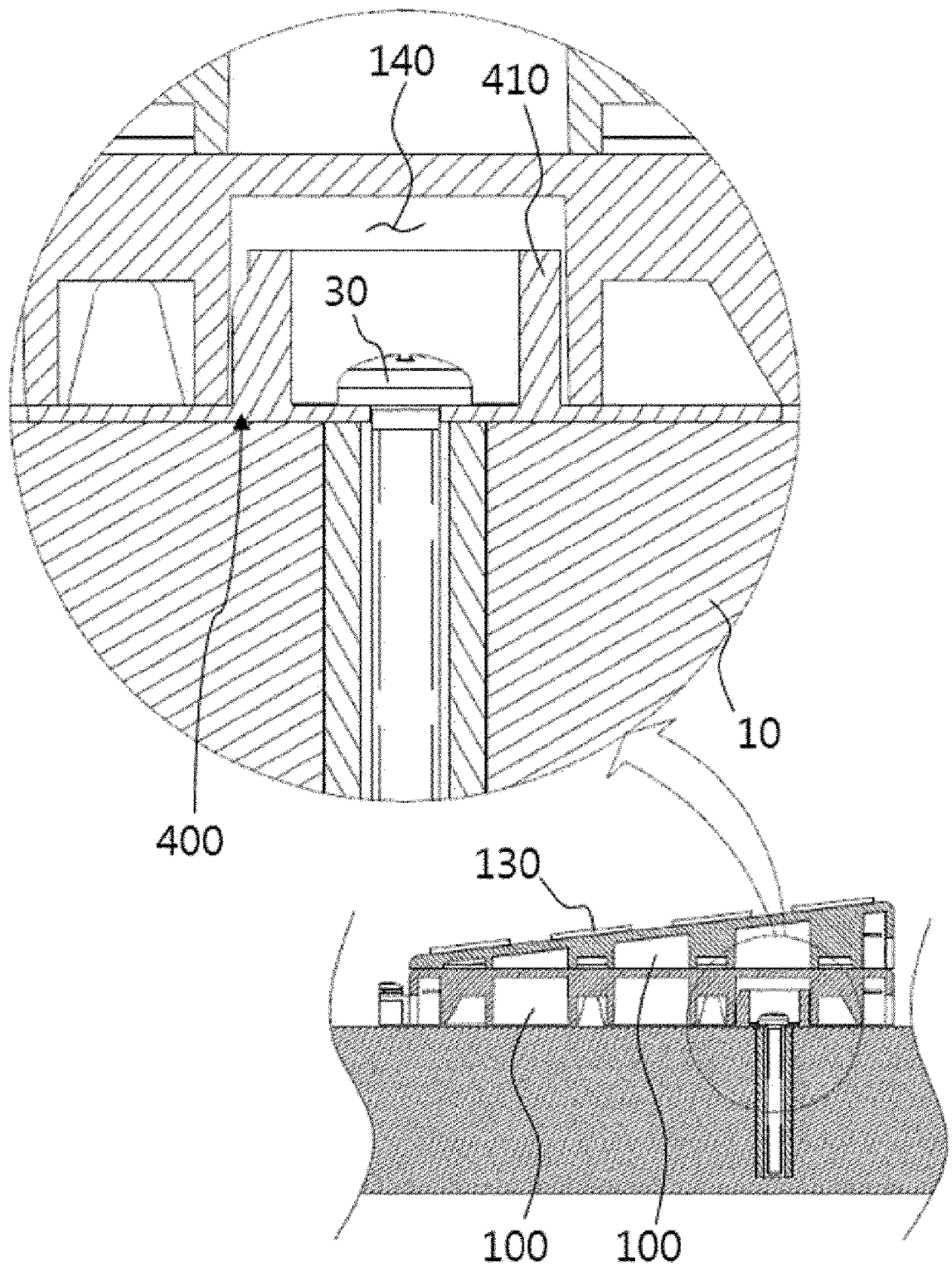
FIG. 11 is a cross-cross-sectional view of another embodiment of a fastener according to the present invention.

FIG. 10 is a coupling cross-cross-sectional view of one embodiment of a fixing member 400 according to the present invention, and FIG. 11 is a coupled cross-section view of another embodiment of the fixing member 400.

Referring to FIGS. 10 and 11, the fixing member 400 applied to the present invention will be described in more detail.

The fixing member 400 is to fix the block-type modular ramp of the present invention to an installation floor where to install the ramp, and serves to engage with a block body 100 so as to firmly fix the block body 100 to the floor.

A fitting groove 140 is formed in a lower portion of the block body 100. The fitting groove 140 is in a circular shape and has a structure in which the fixing member 400 is attached to and detached from the fitting groove 140. The fixing member 400 includes a fixing support body 410 which is detachably attached to the fitting groove 140. The fixing support body 410 has a cylindrical shape with an open top, and the open top is engaged with the fitting groove 140 of the block body 100. The lower surface of the fixing support body 410 is formed as a flat surface, and a hole 420 is formed in the center of the lower surface.

The block-type modular ramp of the invention may be fixed to the installation floor in two methods.

That is, as shown in FIG. 10, one of the methods is to fix the ramp to the installation floor 10 using a double-sided tape 20. This may be mainly applied in a room where the installation floor 10 is flat. Further, the present invention is mainly applicable to a place where the installation floor 10 forms a smooth surface such as vinyl flooring or marble. In the fixing method using the double-sided tape 20, the double side tape 20 is attached to the lower surface of the fixing support body 410, foreign matters and the like on the installation floor 10 are removed, and then the double surface tape 20 is attached to and fixed to the installation floor 10 after a release paper is separated therefrom. In this method, it is possible to reduce the working time for installation and improve the ease of working.

Next, as shown in FIG. 11, the other method is to fix the ramp to the installation floor 10 using an anchor bolt 30. This can be mainly applied to the outdoors where the installation floor 10 is uneven. In addition, it can be mainly applied to a place where the double-sided tape 20 is not used, such as a concrete floor surface. In the fixing method using the anchor bolt 30, the anchoring pin 30 is installed at the installation floor 10 to fix the fixing support body 410 to the installation floor 10 in a state in which the anchoring bolt 30 is engaged with a lower hole 420 of the fixing support body 410. Then, the manufactured block-type modular ramp is attached to the fixing support body 410. That is, this is a structure in which the fitting groove 140 formed in the lower portion of the block body 100 is inserted into and fixed to the fixing support body 410 fixed to the installation floor 10.

The use state of the block-type modular ramp of the present invention described above will be described with reference to FIGS. 1 to 11.

First, an installation place is checked, and block bodies 100 are assembled in consideration of a height of a step, a bump, or the like. At a time of assembling the block bodies 100, the block bodies 100 are aligned and coupled in a horizontal direction using the fastening member 200 and the block bodies 100 stacked vertically are coupled using the fixing pin 300.

At a time of fastening the fixing pin 300, the fitting pin 310 is first engaged with the fixing hole 120 to which the fixing pin 300 is to be fastened, and at this point, the first reference protrusion 311 is engaged in alignment with the first key groove 121. Then, the support pin 320 is inserted into a hole formed in the center of the fitting pin 310 to complete the fastening of the fixing pin 300, and at this point, the second reference protrusion 321 is fitted and fastened to the second key groove 131.

The fixing member 400 with the double-sided tape 20 attached thereto is fastened to the fitting groove 140. After the foreign matters and the like on the installation floor 10 are removed, the release paper of the double-sided tape 20 is separated and the block-type modular ramp is installed at the installation floor 10.

Then, at a time of removing the block-type modular ramp, the entire block bodies 100 is lifted upward to separate the fixing member 400 from the fitting groove 140. In order to widen the gap between the block body 100 and the mounting floor 10 to detach the fixing member 400, a tool such as a minus driver may be used. When the fastening member 400 is separated, the fixing member 400 is removed from the installation floor 10.

The fixing pin 300 and the fastening member 200 are separated from the block bodies 100. At a time of separating the fixing pin 300, the gap between the fitting pin 310 and the support pin 320 is widened using a minus driver and then the fastening protrusion 322 of the fixing fin 300 is detached and separated from the long hole 312 of the fitting fin 310. When the support pin 320 is separated, the lower portion of the fitting pin 310 is pressed inward to separate the locking protrusion 313 from the fixing hole 120.

When the block-type modular ramp of the present invention described above is used, it is possible to easily perform fastening and detaching operations using the fixing member 400 with respect to a floor surface on which the ramp is installed. In addition, a separate installation space is not necessary compared to a related art, and when the fixing pin 300 is configured in a double structure of the fitting pin 310 and the support pin 320, an operation of engaging and disengaging the fixing pin 300 may be guided to be performed more easily, and thus, it is possible to prevent both the breakage of the fixing pin 300 and the damage of the block bodies 100 to which the fixing pin 300 is engaged.

Although it has been described in the above that all the components of an embodiment of the present invention are coupled as a single unit or coupled to be operated as a single unit, the present invention is not necessarily limited to such an embodiment. Namely, within the purpose of the present invention, one or more components among the components may be selectively coupled to be operated as one or more units. In addition, since terms, such as "including," "comprising," and "having" mean that one or more corresponding components may exist unless they are specifically described to the contrary, it shall be construed that one or more other components can be further included. All of the terminologies including one or more technical or scientific terminologies have the same meanings that those having ordinary knowledge in the technical field of the present invention understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those having ordinary knowledge in the technical field of the present invention will appreciate that various modifications, additions and substitutions are possible, without departing from the scope and spirit of the invention. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and it should be construed that all of the technical ideas included within the scope equivalent to the claims are included within the right scope of the present invention.

What is claimed is:

1. A block-type modular ramp to be provided in a place where a step or bump is formed, the block-type modular ramp comprising:
    a plurality of block bodies arranged in a horizontal direction and stacked vertically to form a backbone;
    a fastening member for fastening the block bodies arranged in the horizontal direction to each other;
    a plurality of fixing pins for fixing the block bodies stacked vertically to each other; and
    a fixing member coupled to the block bodies and fixing the block bodies to a floor surface where to install the ramp,
    wherein a plurality of fastening grooves is formed in the block bodies from a lower portion to an upper portion thereof, the fastening member is fastened between a fastening groove formed in one of the block bodies and a fastening groove formed in the other block body so as to engage the block bodies with each other in a horizontal direction,
    wherein a plurality of fixing holes is formed in the block bodies in an up-down direction, the fixing holes formed between the block bodies stacked vertically are located on a vertical line, and an upper block body and a lower block body are coupled to each other while the fixing pins are fastened through the fixing holes,
    wherein a first key groove is formed in an upper portion of the fixing hole in an outward direction, and a first reference protrusion is formed in the fixing pin so as to correspond to and engage with the first key groove,
    wherein an anti-slip member projecting upward is formed in an outer periphery of an upper end of each of the plurality of fixing holes,
    wherein a second key groove is further formed in the anti-slip member, and a second reference projection corresponding to and engaging with the second key groove is further formed in the fixing pin.

2. The block-type modular ramp of claim 1, wherein each of the plurality of fixing pins comprise:
    a cylindrical fitting pin having an upper end caught and supported by an upper outer periphery of the fixing hole, a lower end caught and supported by a lower outer periphery of the fixing hole, an elongated hole formed in a longitudinal direction to be engaged with the fixing hole, and the first reference projection formed therein; and
    a support pin having an upper end portion caught and supported by the upper end of the fitting pin, and a lower end inserted into the fitting pin to press the lower end of the fitting pin outward, and the second reference protrusion formed therein.

3. The block-type modular ramp of claim 1, wherein at least one anti-slip bump is further formed in the anti-slip member.

4. The block-type modular ramp of claim 1,
    wherein the fixing member comprises a fixing support body detachably fitted into a fitting groove that is formed in a lower portion of the block body, and
    wherein the fixing support body is in a cylindrical shape with an open top, a lower surface of the fixing support body is formed as a flat surface, and a hole is formed in a center of the lower surface.

* * * * *